(12) United States Patent
Nagano et al.

(10) Patent No.: US 12,406,422 B2
(45) Date of Patent: Sep. 2, 2025

(54) 3D DIGITAL AVATAR GENERATION FROM A SINGLE OR FEW PORTRAIT IMAGES

(71) Applicant: NVIDIA Corporation, Santa Clara, CA (US)

(72) Inventors: Koki Nagano, Playa Vista, CA (US); Jaewoo Seo, Kirkland, WA (US)

(73) Assignee: NVIDIA Corporation, Santa Clara, CA (US)

(*) Notice: Subject to any disclaimer, the term of this patent is extended or adjusted under 35 U.S.C. 154(b) by 301 days.

(21) Appl. No.: 18/185,217

(22) Filed: Mar. 16, 2023

(65) Prior Publication Data

US 2023/0298243 A1 Sep. 21, 2023

Related U.S. Application Data

(60) Provisional application No. 63/320,864, filed on Mar. 17, 2022.

(51) Int. Cl.
*G06T 13/40* (2011.01)
*G06T 13/80* (2011.01)

(52) U.S. Cl.
CPC .............. *G06T 13/40* (2013.01); *G06T 13/80* (2013.01)

(58) Field of Classification Search
CPC ............................... G06T 13/40; G06T 13/80
See application file for complete search history.

(56) References Cited

U.S. PATENT DOCUMENTS

| | | | |
|---|---|---|---|
| 2019/0340419 A1* | 11/2019 | Milman | G06N 20/00 |
| 2020/0402284 A1* | 12/2020 | Saragih | G06V 10/757 |
| 2021/0312683 A1* | 10/2021 | Linton | G06N 3/045 |
| 2022/0068007 A1* | 3/2022 | Lafer | G06T 7/50 |

* cited by examiner

*Primary Examiner* — Michelle Chin
(74) *Attorney, Agent, or Firm* — Leydig, Voit & Mayer, Ltd.

(57) ABSTRACT

A system and method for generating a digital avatar from a two-dimensional input image in accordance with a machine learning models is provided. The machine learning models are generative adversarial networks trained to process a latent code into three-dimensional data and color data. A generative adversarial network (GAN) inversion optimization algorithm is run on the first machine learning model to map the input image to a latent code for the first machine learning model. The latent code is used to generate unstructured 3D data and color information. A GAN inversion optimization algorithm is then run on the second machine learning model to determine a latent code for the second machine learning model, based at least on the output of the first machine learning model. The latent code for the second machine learning model is then used to generate the data for the digital avatar.

20 Claims, 15 Drawing Sheets

3D DIGITAL AVATAR GENERATION FROM A SINGLE OR FEW PORTRAIT IMAGES

CROSS REFERENCE TO RELATED APPLICATIONS

This application claims priority to U.S. Provisional Patent Application No. 63/320,864, filed on Mar. 17, 2022, which is hereby incorporated by reference in its entirety.

STATEMENT REGARDING FEDERALLY SPONSORED RESEARCH AND DEVELOPMENT

This invention was made with government support under Agreement No. HR00112030005, awarded by DARPA. The government has certain rights in the invention.

BACKGROUND

Many computer-based applications make use of three-dimensional (3D) geometry data to render or animate digital characters. For example, computer games make use of 3D geometry data to render characters in different poses or with different expressions or features depending on the context of the game. Vertices or polygons of a mesh or wireframe can be manipulated by an algorithm to changes the relative location of various surfaces that make up the character or an object relative to a virtual viewpoint. A rendering algorithm is then used to create a two-dimensional (2D) image of the 3D character or object from the virtual viewpoint to generate a frame of video for the game. The mesh can be manipulated for the next time step, and then a subsequent frame can be rendered.

As another example, video conferencing applications may make use of 3D geometry data to render virtual representations of one or more people in the frame of view of a digital camera. Rather than streaming an image captured by the digital camera to a remote application, the video conferencing software could render a virtual representation of a person to replace the person in the captured image. Thus, a person could be displayed to a remote user to look like a cat or a cartoon-version of themselves. Other applications could make use of 3D digital avatars as well including, but not limited to, online discussion forums or virtual worlds such as the metaverse.

Manual creation of digital characters or avatars can be resource intensive. Animators can spend many hours manipulating or creating a 3D mesh to create a model of the character in the form of 3D geometry data. Once the model is created, surface textures or color and shading properties must be set for each surface. Even with the skill necessary to create such 3D models, the results may not be sufficiently realistic. Thus, there is a desire to come up with solutions for automatically creating the 3D geometry data for such digital avatars.

One of the prior techniques for creating 3D geometry data automatically can be referred to as photogrammetry. Typically, a large number of cameras is positioned radially or spherically around a subject placed in the center so that a large number of synchronized images of the subject can be captured from different viewpoints. This technique may compute accurate geometry and texture for a subject, but it always requires capturing multiple high quality pictures taken in a special studio environment. Furthermore, the output is typically not directly usable for DCC nor animatable. Processing one scan can also take from tens of minutes to hours. Another solution is based on a linear, 3D morphable model (3DMM). This technique may morph an existing model to try to fit the appearance of a person in an image. While this technique can produce a DCC-friendly character from one or few casual portraits, the geometry and texture qualities often do not meet today's high digital content standard. Many of the prior techniques either require very controlled settings with lots of specialized equipment or do not produce output of high enough quality to satisfy users.

It is therefore desired to find new techniques for automatic DCC that has the following features: (1) requires only a single (or a few), in-the-wild, image(s); (2) can reconstruct a wide variety of 3D faces including arbitrary expressions; and (3) only requires milliseconds to produce high-quality results.

SUMMARY

Embodiments of the present disclosure relate to generating a 3D digital avatar from a single or a few portrait images. An end-to-end system to automatically creates a high fidelity 3D avatar from a single or multiple portraits. The created avatar is a digital clone of the person in the virtual space, capable of making a full range of facial expressions, that is ready to be used in digital content creation (DCC) applications. The system also can generate virtually an infinite number of 3D avatars that do not exist. Existing systems lack the sufficient visual quality (in terms of likeness to the input person), cannot generate DCC-ready digital assets, or cannot produce anonymous avatars.

In accordance with a first aspect of the present disclosure, a method is provided for generating a 3D digital avatar from a two-dimensional 2D input image in accordance with a first ML model and a second ML model. The method includes determining a latent code for the second ML model, based at least on the 2D input image, and generating, via the second ML model, three-dimensional (3D) data and color data representing the digital avatar in accordance with the latent code for the second ML model.

In accordance with some embodiments of the first aspect, determining the latent code for the second ML model comprises: executing a GAN inversion optimization algorithm for the first ML model to determine a latent code for the first ML model; and executing a GAN inversion optimization algorithm for the second ML model to determine the latent code for the second ML model.

In accordance with some embodiments of the first aspect, executing the GAN inversion optimization algorithm for the first ML model comprises: initiating a current latent code for the first ML model; applying the current latent code to the first ML model to generate 3D data and color data corresponding to the current latent code for the first ML model; generating an output image from the 3D data and color data corresponding to the current latent code for the first ML model; and computing a loss function based on a comparison of the output image with the 2D input image. The GAN inversion optimization algorithm further comprises, for each iteration in a number of iterations: computing a candidate latent code by adding noise to the current latent code, applying the candidate latent code to the first ML model to generate 3D data and color data corresponding to the candidate latent code, generating a candidate output image from the 3D data and color data corresponding to the candidate latent code, and computing a loss function based on a comparison of the candidate output image with the 2D input image. During each iteration, the GAN inversion optimization algorithm further comprises determining whether to update the current latent code to the candidate latent code based on a comparison of the loss functions associated with the candidate latent code and the current latent code. Finally, after all the iterations are complete, the GAN inversion optimization algorithm comprises determining that the latent code for the first ML model is the current latent code at the end of the number of iterations.

In accordance with some embodiments of the first aspect, executing the GAN inversion optimization algorithm for the second ML model comprises: initiating a current latent code for the second ML model; applying the current latent code to the second ML model to generate 3D data and color data corresponding to the current latent code for the second ML model; and computing a loss function based on a comparison of at least one of the 3D data and color data corresponding to the current latent code for the second ML model with at least one of the 3D data and color data corresponding to the latent code for the first ML model. The GAN inversion optimization algorithm further comprises, for each iteration in a number of iterations: computing a candidate latent code by adding noise to the current latent code for the second ML model, applying the candidate latent code to the second ML model to generate 3D data and color data corresponding to the candidate latent code for the second ML model, and computing a loss function based on a comparison of at least one of the 3D data and color data corresponding to the candidate latent code for the second ML model with at least one of the 3D data and color data corresponding to the latent code for the first ML model. During each iteration, the GAN inversion optimization algorithm further comprises determining whether to update the current latent code for the second ML model to the candidate latent code for the second ML model based on a comparison of the loss functions associated with the candidate latent code for the second ML model and the current latent code for the second ML model. Finally, after all the iterations are complete, the GAN inversion optimization algorithm comprises determining that the latent code for the second ML model is the current latent code for the second ML model at the end of the number of iterations.

In accordance with some embodiments of the first aspect, the first ML model is a generative adversarial network (GAN) that is trained to generate unstructured 3D data and color data, and the second ML model is a generative adversarial network (GAN) that is trained to generate a mesh and a texture map.

In accordance with some embodiments of the first aspect, the first ML model is an Efficient Geometry-aware 3D (EG3D) Generative Adversarial Network, and the second ML model is StyleGAN2.

In accordance with some embodiments of the first aspect, the method further comprises training an encoder network to infer the latent code for the second ML model based on a training data set that comprises a number of pairs of input images and corresponding ground-truth latent codes for the second ML model. The training data set is generated using a GAN inversion optimization algorithm applied to the first ML model and the second ML model.

In accordance with some embodiments of the first aspect, determining the latent code for the second ML model comprises processing the 2D input image with the encoder network to generate the latent code for the second ML model.

In accordance with some embodiments of the first aspect, the 3D data comprises at least one of a mesh or a set of polygons, and wherein the color data comprises at least one texture map associated with the 3D data.

In accordance with some embodiments of the first aspect, the method further comprises rendering an image of the digital avatar based on the 3D data and the color data.

In accordance with a second aspect of the present disclosure, a system is provided for generating a digital avatar in accordance with a first machine learning (ML) model and a second machine learning (ML) model. The system comprises: a memory storing a two-dimensional (2D) input image; and at least one processor to: determine a latent code for the second ML model, based at least on the 2D input image; and generate, via the second ML model, three-dimensional (3D) data and color data representing the digital avatar in accordance with the latent code for the second ML model.

In accordance with some embodiments of the second aspect, determining the latent code for the second ML model comprises: executing a GAN inversion optimization algorithm for the first ML model to determine a latent code for the first ML model; and executing a GAN inversion optimization algorithm for the second ML model to determine the latent code for the second ML model.

In accordance with some embodiments of the second aspect, executing the GAN inversion optimization algorithm for the first ML model comprises: initiating a current latent code for the first ML model; applying the current latent code to the first ML model to generate 3D data and color data corresponding to the current latent code for the first ML model; generating an output image from the 3D data and color data corresponding to the current latent code for the first ML model; and computing a loss function based on a comparison of the output image with the 2D input image. The GAN inversion optimization algorithm further comprises, for each iteration in a number of iterations: computing a candidate latent code by adding noise to the current latent code, applying the candidate latent code to the first ML model to generate 3D data and color data corresponding to the candidate latent code, generating a candidate output image from the 3D data and color data corresponding to the candidate latent code, and computing a loss function based on a comparison of the candidate output image with the 2D input image. During each iteration, the GAN inversion optimization algorithm further comprises determining whether to update the current latent code to the candidate latent code based on a comparison of the loss functions associated with the candidate latent code and the current latent code. Finally, after all the iterations are complete, the GAN inversion optimization algorithm comprises determining that the latent code for the first ML model is the current latent code at the end of the number of iterations.

In accordance with some embodiments of the second aspect, executing the GAN inversion optimization algorithm for the second ML model comprises: initiating a current latent code for the second ML model; applying the current latent code to the second ML model to generate 3D data and color data corresponding to the current latent code for the second ML model; and computing a loss function based on a comparison of at least one of the 3D data and color data corresponding to the current latent code for the second ML model with at least one of the 3D data and color data corresponding to the latent code for the first ML model. The GAN inversion optimization algorithm further comprises, for each iteration in a number of iterations: computing a candidate latent code by adding noise to the current latent code for the second ML model, applying the candidate latent code to the second ML model to generate 3D data and color data corresponding to the candidate latent code for the second ML model, and computing a loss function based on a comparison of at least one of the 3D data and color data corresponding to the candidate latent code for the second ML model with at least one of the 3D data and color data corresponding to the latent code for the first ML model. During each iteration, the GAN inversion optimization algorithm further comprises determining whether to update the current latent code for the second ML model to the candidate latent code for the second ML model based on a comparison of the loss functions associated with the candidate latent code for the second ML model and the current latent code for the second ML model. Finally, after all the iterations are complete, the GAN inversion optimization algorithm comprises determining that the latent code for the second ML model is the current latent code for the second ML model at the end of the number of iterations.

In accordance with some embodiments of the second aspect, the first ML model is a generative adversarial network (GAN) that is trained to generate unstructured 3D data and color data, and the second ML model is a generative adversarial network (GAN) that is trained to generate a mesh and a texture map.

In accordance with some embodiments of the second aspect, the first ML model is an Efficient Geometry-aware 3D (EG3D) Generative Adversarial Network, and the second ML model is StyleGAN2.

In accordance with some embodiments of the second aspect, the at least one processor is further to: train an encoder network to infer the latent code for the second ML model based on a training data set that comprises a number of pairs of input images and corresponding ground-truth latent codes for the second ML model. The training data set is generated using a GAN inversion optimization algorithm applied to the first ML model and the second ML model.

In accordance with some embodiments of the second aspect, determining the latent code for the second ML model comprises processing the 2D input image with the encoder network to generate the latent code for the second ML model.

In accordance with some embodiments of the second aspect, the system further comprises a communications interface configured to transmit at least one of the 3D data and color data, or an image generated based on the 3D data and color data, to a third-party application. The communications interface may be one of a network interface, an inter-processor high-speed interface, a communications bus, an NVLink, a PCIe link, or the like.

In accordance with a third aspect of the present disclosure, a non-transitory computer-readable medium is provided that stores instructions for generating a digital avatar from a two-dimensional (2D) input image in accordance with a first machine learning (ML) model and a second machine learning (ML) model. The instructions, responsive to being executed by at least one processor, cause the processor to perform the method of the first aspect.

BRIEF DESCRIPTION OF THE DRAWINGS

The present systems and methods for generating a 3D digital avatar from a single or a few portrait images are described in detail below with reference to the attached drawing figures.

DETAILED DESCRIPTION

Figure 1:
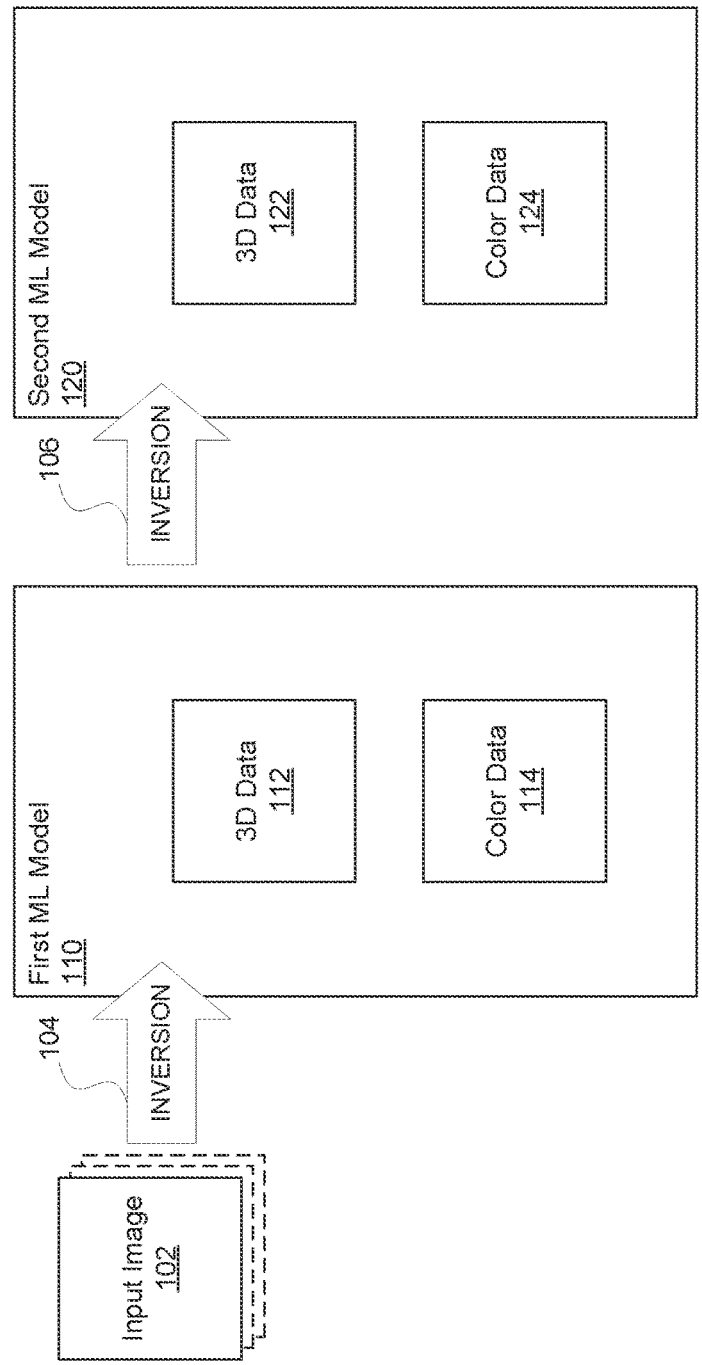
FIG. 1 illustrates a block diagram of an example image to 3D face pipeline, in accordance with some embodiments of the present disclosure.

Systems and methods are disclosed for automating digital content creation tasks. Specifically, the methods provided may be used to generate a 3D digital avatar from a single or a few portrait images. The goal is to generate high-quality and DCC-ready geometry data for 3D faces from a single (or a few) 2D portraits.

Machine learning (ML) models have been trained to process images and generate 3D geometry data therefrom. For example, 3D-StyleGAN is a non-linear generative adversarial network that is trained to morph a 3DMM to match the features of a person represented in a single 2D image. The quality of the result generated from a single image using this single model, however, may still not meet the high standards of DCC tasks because the information.

The approach disclosed herein leverages two existing ML models, that have been fully trained to perform a particular task. The first ML model is referred to as EG3D: an Efficient Geometry-aware 3D Generative Adversarial Network. EG3D is trained to process a single 2D image to synthesize high-resolution multi-view consistent images in real-time along with corresponding high-quality 3D geometry. EG3D is described in more detail in Chan et al., "Efficient, Geometry-aware 3D Generative Adversarial Networks," arXiv: 2112.07945, Dec. 15, 2021, and available on GitHub at https://nvlabs.github.io/eg3d/, the entire contents of which are incorporated herein by reference. EG3D relies on a 3D structure aware inductive bias within the GAN architecture to produce rendered images that are multi-view consistent because the rendered image, from any viewpoint, is based on the same representation of the 3D structure of the object.

The second ML model is referred to as StyleGAN2: an improvement on a style-based Generative Adversarial Network. StyleGAN2 is described in more detail in Karras et al., "Analyzing and Improving the Image Quality of StyleGAN," arXiv:1912.04958, Dec. 3, 2019, and available on GitHub at https://github.com/NVlabs/stylegan2, the entire contents of which are incorporated herein by reference. A style-based GAN can be used to apply a latent vector representing a particular style to synthesize an image that resembles an input image but with a style that matches the latent vector. The latent vector for a particular style can also be generated by analyzing a second input image to extract the style representation from the second input image. StyleGAN2 can be modified to output 3D geometry data rather than a 2D image, thereby generating a mesh or surfaces that represent an object that can be rendered to generate the synthesized image. For example, the StyleGAN2 architecture can be retrained to reproduce <x, y, z> coordinates of a mesh rasterized in UV space in place of the typical RGB channels of a 2D output image. Similarly, the same architecture can reproduce RGB channels of texture maps rasterized in UV space in place of the RGB channels. One generator can be trained to produce 6 channel output, including both the 3D data and the color data, or two generators can be trained to produce 3 channel output based on a shared latent vector, one generator configured to generate the 3D data and the other generator configured to generate the color data. This modified version of StyleGAN2.

While the two ML models are trained to perform their particular tasks well, the output of either model is not sufficient to produce the desired high-quality DCC output that can be leveraged by the various applications described above. Instead, the approach described herein uses a technique called GAN inversion to leverage these two trained models to generate a high-quality output from a single or a small number of input images (e.g., 2D portraits). The resulting output is a parametric 3D model (geometry and texture) ready for DCC applications. The GAN inversion technique is described in more detail in Roich et al., "Pivotal Tuning for Latent-based Editing of Real Images," arXiv:2106.05744, Jun. 10, 2021, the entire contents of which is incorporated herein by reference.

Once the above discussed technique has been run for a large number of input images, then a shortcut can be employed to speed up the process. In particular, an encoder network (e.g., a CNN) can be trained to learn the mapping of an input image to a latent code for the second ML mode. In this manner, the GAN inversion can be avoided and the process to generate the output only requires one pass through the encoder network and one pass through the second ML model. This can be used to generate DCC-ready content in near-real time rather than taking minutes or hours to execute. This impressive speed up enables the integration of the use of automatically generated digital avatars into many real-time applications.

FIG. 1 illustrates a block diagram of an example image to 3D face pipeline, in accordance with some embodiments of the present disclosure. The pipeline includes two machine learning (ML) models, including a first ML model 110 and a second ML model 120. In an embodiment, the ML models are generative adversarial networks (GANs). The first ML model 110 generates unstructured 3D data 112 and color data 114 from an input. The unstructured 3D data 112 may include geometry data in the form of a point cloud, a signed density function (SDF), or the like. In an embodiment, the unstructured 3D data 112 can be represented as neural radiance fields. The unstructured 3D data 112 can be converted to structured 3D data by converting to a mesh representation using, e.g., a marching cubes algorithm, or the like. Neural radiance fields are described in more detail at Mildenhall et al., "NeRF: Representing Scenes as Neural Radiance Fields for View Synthesis," arXiv:2003.08934, Aug. 3, 2020, which is herein incorporated by reference in its entirety. The marching cubes algorithm is described in more detail at Lorensen et al., "Marching cubes: A high resolution 3D surface construction algorithm," ACM Transactions on Graphics (ToG), 1987, which is herein incorporated by reference in its entirety. In alternative embodiments, the unstructured 3D data can be represented as a neural signed distance function (SDF).

The color data 114 may be a color image of the object(s) associated with the 3D data 112 in a format such as RGB. In some embodiments, the color data 114 can be represented as neural radiance fields. The second ML model 120 generates 3D data 122 and color data 124. The 3D data 122 is structured 3D data and can be represented by a mesh, a set of polygons, or the like that defines vertices of surfaces associated with an object(s). The color data 124 may be a texture map(s) that corresponds to <u, v> coordinates associated with the polygons of the 3D data 122.

An input image 102 is provided which shows an object (e.g., a person) from a single viewpoint. In some cases, multiple input images 102 can be supplied showing the person from a small number (e.g., 3, 5, etc.) of different viewpoints. The goal of the techniques described below will be to generate, via the second ML model 120, a representative mesh and texture map of the person seen in the input image 102. The mesh and texture map can then be rendered from an arbitrary viewpoint to generate a rendered image of the person that appears to be similar to the person in the original input image 102. Conventional algorithms known in the art can then be used to animate the mesh and render a digital avatar of the person over a number of frames.

It will be appreciated that this is a difficult task as the single input image 102 does not include depth information about the shape of the person's face, head, neck, etc., and some of these features may be obscured by the person's hair or clothes. It can also be difficult to infer depth information from a small number of input images 102 from different viewpoints, especially when there is no guarantee that the images are synchronized in time (i.e., images may be captured at different times where the person has moved their mouth, or their hair has moved, between pictures).

The first ML model 110 and the second ML model 120 are fully trained to infer the described outputs based on a corresponding input. Neither the first ML model 110 or the second ML model 120 is trained to infer their corresponding outputs based on the input image 102. Therefore, the technique described herein cannot rely on simply inferring the output directly from the provided input image 102. Instead, a GAN inversion optimization step will be utilized with both trained models to find the best version of the output produced by the trained model that comes closest to matching the input.

In an embodiment, the first ML model 110 is a trained instance of EG3D, and the second ML model 120 is a trained instance of StyleGAN2. While these two models have been selected to show that the algorithms described herein are effective to generate DCC-ready avatars from as little as a single input image, it should be appreciated that this technique may be applied to other ML models different from EG3D and/or StyleGAN2. Other models that are trained to produce similar outputs may be used in lieu of the models disclosed herein.

In an embodiment, data that represents a 3D digital avatar can be generated using a two-step approach. In a first step, a GAN inversion optimization 104 is performed for the first ML model 110. The GAN inversion optimization 104 is an iterative process that determines a latent code that represents the input to the first ML model 110 that will produce an output that most closely matches the input image 102. In a second step, a GAN inversion optimization 106 is performed for the second ML model 120. The GAN inversion optimization 106 is an iterative process that determines a latent code that represents the input to the second ML model 120 that will produce an output that most closely matches the result of the GAN inversion optimization 104. In other words, the GAN inversion optimization 106 attempts to find a latent code that generates an output of the second ML model 120 that most closely matches an output of the first ML model 110 in accordance with the latent code determined via the GAN inversion optimization 104. The result of the second step is a latent code that results in 3D data 122 (e.g., a mesh) and color data 124 (e.g., a texture map) being generated for the 3D digital avatar.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2A:
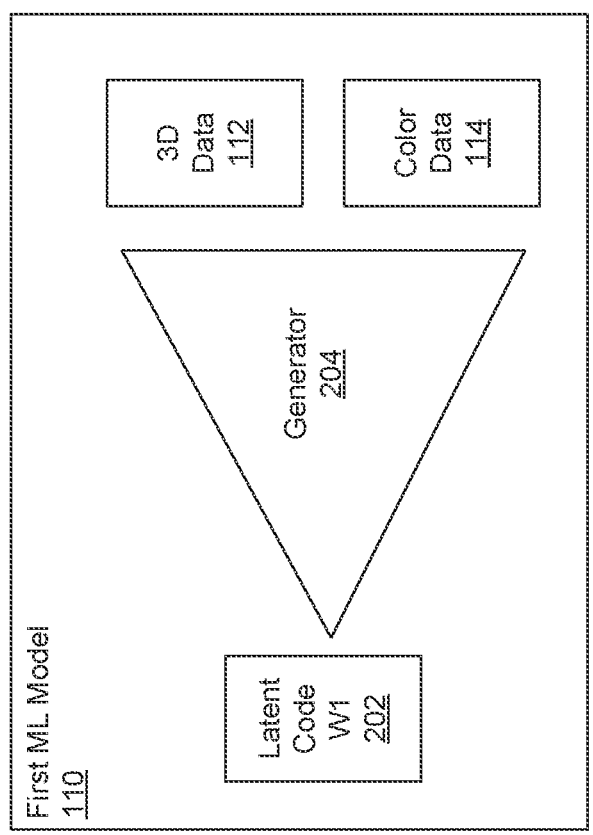
FIGS. 2A & 2B illustrates the two-step process for generating a 3D digital avatar from an input image, in accordance with some embodiments of the present disclosure.
Figure 2B:
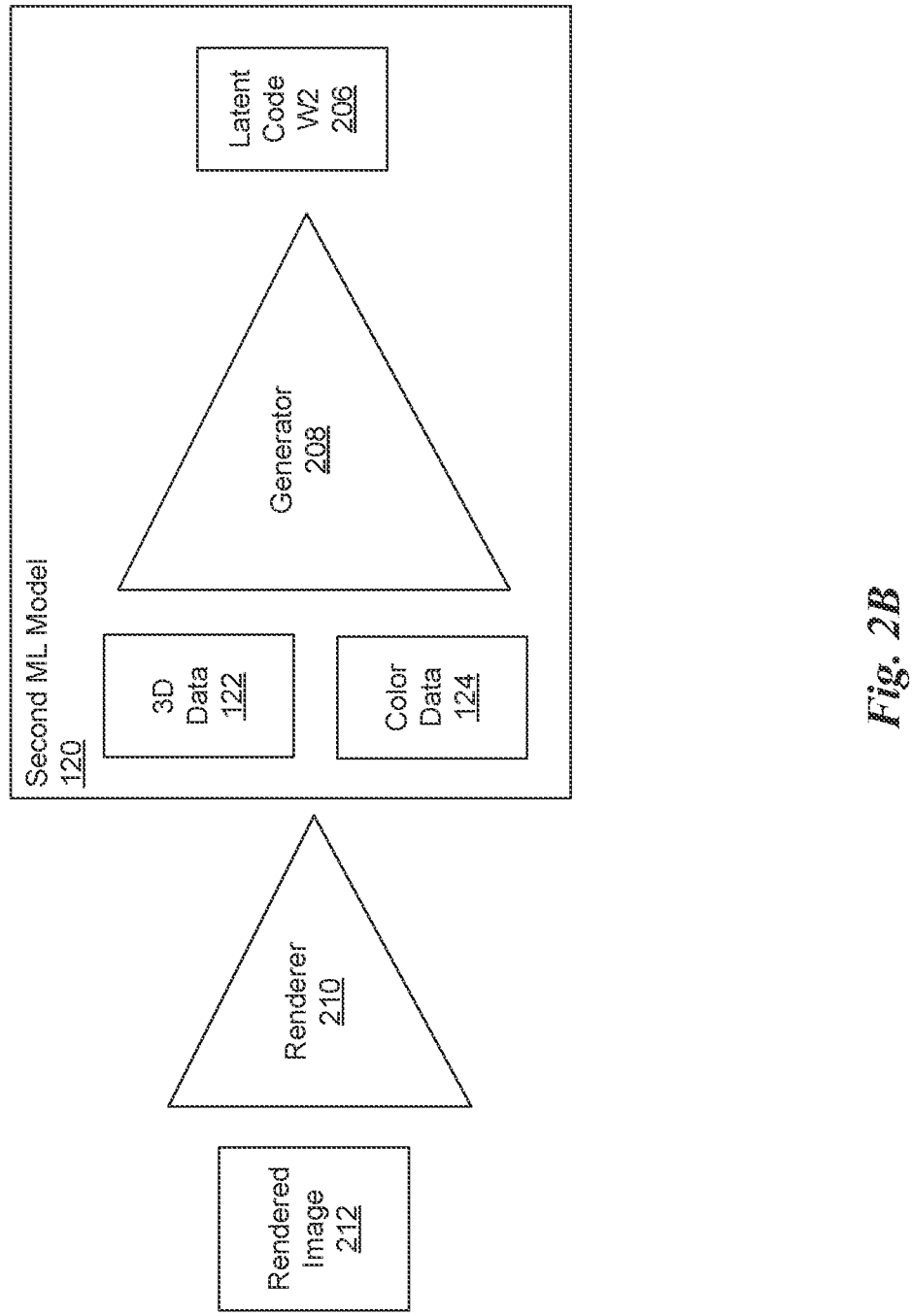

FIGS. 2A & 2B illustrates the two-step process for generating a 3D digital avatar from an input image, in accordance with some embodiments of the present disclosure. As shown in FIG. 2A, the first ML model 110 processes a latent code w1 202 via a generator 204 network to produce the 3D data 112 and color data 114. The generator 204 network represents the layers of the first ML model 110, and the latent code w1 202 represents an input to the first ML model 110. The latent code w1 202 is a vector or tensor suitable as an input to the first ML model 110. In an embodiment, the latent code w1 202 is a 512 element vector, where each element may take the form of a scalar value within a set range (e.g., 0 to 1). By varying the values of each of the 512 elements in the latent code w1 202, the output produced by the generator 204 will also vary. In the first step of the two-step approach described above, the objective is to discover the latent code w1 202 that produces an output that most closely resembles the input image 102.

The GAN inversion optimization 104 of the first ML model 110 is a technique for finding the latent code w1 202 corresponding to an input image 102. The GAN inversion optimization algorithm 104 can be described as follows. First, a large number (e.g., 1000) of random samples of z, where z exhibit a normal distribution, are mapped via mapping function $f$ to the latent space $\mathcal{W}$, where w~$f(z)$. The resulting distribution of w is then given by $\mu_w$, $\sigma_w^2$, where $\mu_w$, is the mean of w and $\sigma_w^2$ is the variance of w. The parameters $\mu_w$, $\sigma_w^2$ are vectors equal in size to the latent code w1 202.

Once the parameters $\mu_w$, $\sigma_w^2$ are determined, the GAN inversion optimization 104 algorithm initially sets w=$\mu_w$. During each iteration, a new candidate latent code is calculated by adding Gaussian noise to w, as follows:

$$\tilde{w}=w+\mathcal{N}(0,0.05\sigma_w t^2),\qquad\text{(Eq. 1)}$$

where parameter t goes from 1 to 0 over a first number of iterations (e.g., 750). A loss function is then calculated for $\tilde{w}$ by comparing the output of the generator 204 network for latent code $\tilde{w}$ with the input image 102. The loss function can be defined as the learned perceptual image patch similarity (LPIPS) distance between two image patches of the images being compared. The image patches can be, e.g., a patch of pixels at the center of the image, or the entire image down-sampled to a fixed size (e.g., 64×64 pixels). If the loss function for $\tilde{w}$ is smaller than the previously calculated loss function for w, then w is set equal to $\tilde{w}$ for the next iteration. Otherwise, w remains the same for the next iteration.

For embodiments where more than one input image is provided, then the loss function is based on the LPIPS distance for all of the input images 102. In other words, the output of the generator 204 can be used to generate output images corresponding to each view of the plurality of input images 102. The LPIPS distance can be calculated for each input image, and the loss function can be a combination (e.g., average, sum, etc.) of the individual LPIPS distances. In other words, the loss function identifies the best 3D representation that most closely matches the set of all input images.

For each iteration, the loss function for the candidate latent code can be compared with the loss function for the current latent code, and the current latent code can be updated to the candidate latent code (w=$\tilde{w}$) if the loss function for the candidate latent code is less than the loss function for the current latent code, which is computed in the same manner as described for the candidate latent code. After a large number of iterations, the current latent code should converge on an area within the latent space of the first ML model 110 that is used to generate an optimal output of the first ML model 110 matched to the input image 102.

It will be appreciated that the GAN inversion optimization algorithm 104 is essentially configured to start with a specific latent code defined at the mean of the distribution of samples in the latent space $\mathcal{W}$, and then slowly adjust the latent code over a number of iterations by randomly perturbing said latent code and determining if the new perturbed latent code would result in a better match at the output of the generator 204 network. In addition, the magnitude of the perturbations decreases over time as more and more iterations are run, such that large perturbations are likely at first, but as the number of iterations increases, the perturbations decrease in size to search over a smaller area in the latent space $\mathcal{W}$.

As shown in FIG. 2B, the second ML model 120 processes a latent code w2 206 via a generator 208 network to produce the 3D data 122 and color data 124. It will be appreciated that the data flow of FIG. 2B moves right to left rather than left to right as in FIG. 2A. The generator 208 network represents the layers of the second ML model 120, and the latent code w2 206 represents an input to the second ML model 120. The latent code w2 206 is a vector or tensor suitable as an input to the second ML model 120. In an embodiment, the latent code w2 206 is a 512 element vector, where each element may take the form of a scalar value within a set range (e.g., 0 to 1). Of course, the latent code w2 206 can be of different dimensions than the latent code w1 202, as the particular number of elements in latent codes will be set to match the structure of the different ML models.

In the second step of the two-step approach, another GAN inversion optimization is performed to determine a latent code for the second ML model 120. The GAN inversion optimization 106 of the second ML model 120 is a technique for finding the latent code w2 206 that generates an output of the second ML model 120 that most closely matches the optimized output of the first ML model 110. The GAN inversion optimization 106 algorithm is similar to the GAN inversion optimization 104 algorithm, except a different loss function may be utilized.

First, the parameters $\mu_w$, $\sigma_w^2$ for the latent code w2 206 are determined. Then, a number of iterations are performed to find the optimal latent code w2 206, as described above. However, instead of comparing the output of the generator 204 network with the input image 102 to compute a LPIPS distance, a different loss function compares the output of the generator 208 based on the current latent code $\hat{w}$ with the optimized output of the generator 204 based on the latent code w1 202 that was determined as a result of the GAN inversion optimization 104 algorithm run earlier.

Different embodiments can implement different loss functions for the GAN inversion optimization 106. For example, loss functions can attempt to minimize the difference in geometry by comparing 3D data 112 with 3D data 122. In these embodiments, the loss function is minimizing differences between the 3D geometry data of the outputs of the two generator networks. Alternatives for the loss function can be based on photo-consistency (e.g., calculating the sum of the per-pixel difference between input image(s) and synthesized rendered images), landmark correspondence (e.g., calculating a difference in distance between different facial features like nose, eyes, ears, lips, chin, and the like), face segmentation (e.g., comparing a 2D projection of the rendered 3D face with the input image), or geometry regularization (e.g., an attempt to keep the output close to the statistical mean of the training data set).

Alternatively, the 3D data 122 and color data 124 can be further rendered by a renderer 210 to generate a rendered image 212. Many different rendering algorithms that can be implemented by the renderer 210 are known in the art, for example, rendering a mesh using texture maps via an image processing pipeline like the one disclosed below in FIG. 6A. In some embodiments, the loss function for the GAN inversion optimization 106 should be based on multiple views. The rendered views can correspond to the same views as the input images 102 (when multiple input images are provided), or the rendered views can correspond to unique viewpoints, either selected at random or preset at fixed viewpoints. The renderer may therefore be used to render the output of both the first ML model 110 and the second ML model 120 for computing the loss function based on the rendered images.

Figure 2C:
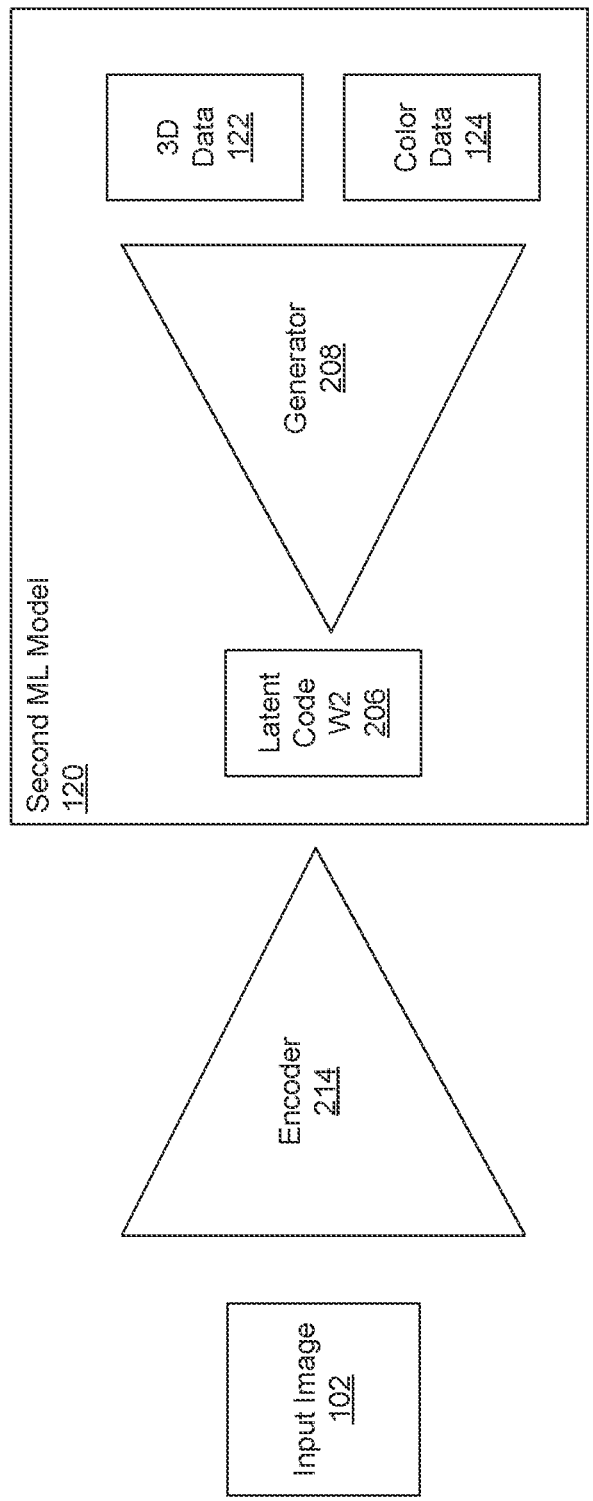
FIG. 2C illustrates a different approach for generating a 3D digital avatar from an input image, in accordance with some embodiments of the present disclosure

FIG. 2C illustrates a different approach for generating a 3D digital avatar from an input image, in accordance with some embodiments of the present disclosure. Once the two-step process, described above, has been performed for a large number of input images 102, then a new approach to the problem that utilizes a trained encoder 214 network can be deployed. The encoder 214 network is trained to infer the latent code w2 206 for the generator 208 of the second ML model 120 directly based on the input image 102. This is because each time an input image 102 is matched to a latent code w2 206 via the two-step process described above, a new sample of a training data set is created, each sample including an input (e.g., the input image 102) and a corresponding ground-truth output (e.g., the latent code w2 206). After generating tens of thousands of results (or more) corresponding to different input images 102, it is possible to train an encoder network to learn to infer the latent code w2 206 based on features in the input image. The encoder 214 network can be, e.g., a deep convolutional neural network that calculates the, e.g., 512 element latent code based on the features in the input image 102.

It will be appreciated that the training data set can be based on real-world as well as synthetic input images. Any computer generated image of a person, including images of completely synthetic people created with a different AI algorithm, can be used to create a new sample of the training data set in accordance with the two-step approach discussed above. In some embodiments, the training data set can also include synthetic images generated by the first ML model 110 using randomized latent vector inputs. The output of the first ML model 110 can then be used in the GAN inversion optimization 106 for the second ML model 120, to generate high-quality digital avatars based on a randomized input for the first ML model 110. The GAN inversion optimization 104 can then be omitted entirely during this process, in order to build up a large synthetic training data set for the encoder network 214.

It will also be appreciated that the GAN inversion optimization algorithm can be computationally intensive because, for each iteration, the ML model is applied to the new latent code in order to generate a new output to calculate the loss function, and each application of the ML model can require a large number of calculations to be performed depending on the complexity of the model. However, given the encoder 214 network, the GAN inversion optimization algorithm can be completely replaced and the first ML model 110 does not have to be run at all. For example, in this two-step process, the encoder 214 network processes the input image 102 during the first step to infer the latent code w2 206. Then, in the second step, the second ML model 120 processes the latent code w2 206 to generate the 3D data 122 and color data 124. This approach can be performed very fast, as all that is required is a single pass through the encoder 214 network and a single pass through the generator 208 network of the second ML model 120.

In some embodiments, this approach may be combined with a reduced GAN inversion optimization step. In such embodiments, the latent code w2 206 generated by the encoder 214 network can be the starting latent code used in the first iteration of the GAN inversion optimization 106 algorithm for the second ML model 120. A smaller number of iterations (e.g., 50 compared to 750) may then be performed from that starting latent code to find the optimal latent code w2 206. Note that in this embodiment of the GAN inversion optimization 106 algorithm, the renderer 210 is used to generate a rendered image 212, and the loss function compares the rendered image 212 with the input image 102 to calculate the LPIPS distance.

As described above, the first and second ML models 110/120 may be implemented as a set of instructions stored in a memory and configured to be executed by one or more processors. However, one of skill in the art will recognize that these components can be implemented as any combination of hardware, firmware, software, or combinations thereof. Furthermore, the input image 102, 3D data 112/122, and color data 114/124 are described as data structures storing information in a memory. These components may be stored in any type of volatile or non-volatile memory accessible to the one or more processors. Furthermore, any other algorithms or processes described herein may also be embodied as a set of instructions stored in a memory and configured to be executed by one or more processors. In exemplary embodiments, the one or more processors may include a host processor, such as a central processing unit (CPU), and/or a parallel processing unit (PPU), graphics processing unit GPU), tensor processing unit (TPU), or the like. One exemplary processor architecture is described in more detail below in FIG. 4.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the 3D avatar generation system is within the scope and spirit of embodiments of the present disclosure.

Figure 3A:
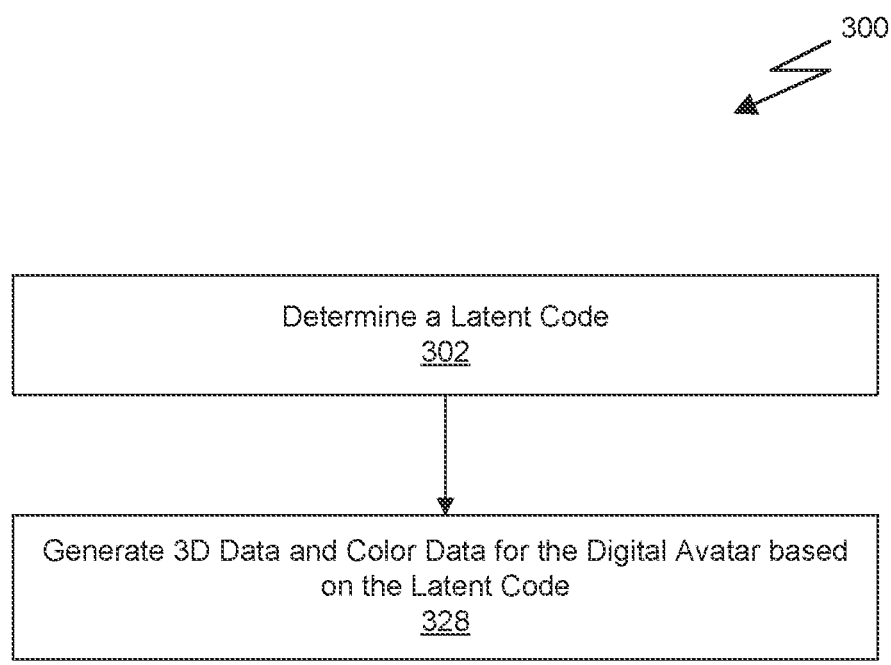
FIG. 3A is a flowchart of a method for generating a 3D digital avatar, in accordance with some embodiments of the present disclosure.

FIG. 3A is a flowchart of a method 300 for generating a 3D digital avatar, in accordance with some embodiments of the present disclosure. In some embodiments, the method 300 may be implemented as a set of instructions executed on at least one processor. In some cases, the at least one processor can include one or more parallel processing units.

At 302, a latent code for the second ML model is determined, based at least one the 2D input image. In an embodiment, the latent code for the second ML model is determined by first performing a GAN inversion optimization algorithm for the first ML model in accordance with a loss function based on the 2D input image. Then, a GAN inversion optimization algorithm is performed for the second ML model in accordance with a loss function based on the output of the first ML model generated using the latent code for the first ML model determined via the GAN inversion optimization algorithm for the first ML model. In another embodiment, the latent code for the second ML model is determined using a trained encoder network that processes the 2D input image to infer the latent code for the second ML model directly.

At 304, 3D data and color data representing the digital avatar are generated via the second ML model, in accordance with the latent code for the second ML model determined at step 302. The 3D data and color data may be optionally rendered to generate a 2D image of the digital avatar. Alternatively, the 3D data and color data may be stored in a memory or transmitted to a third-party application for use in generating 2D image data of the digital avatar by the third-party application. In some cases, the 2D images of the digital avatar may be streamed to a client computer via a network, such as in a video conferencing application or a game streaming application.

Figure 3B:
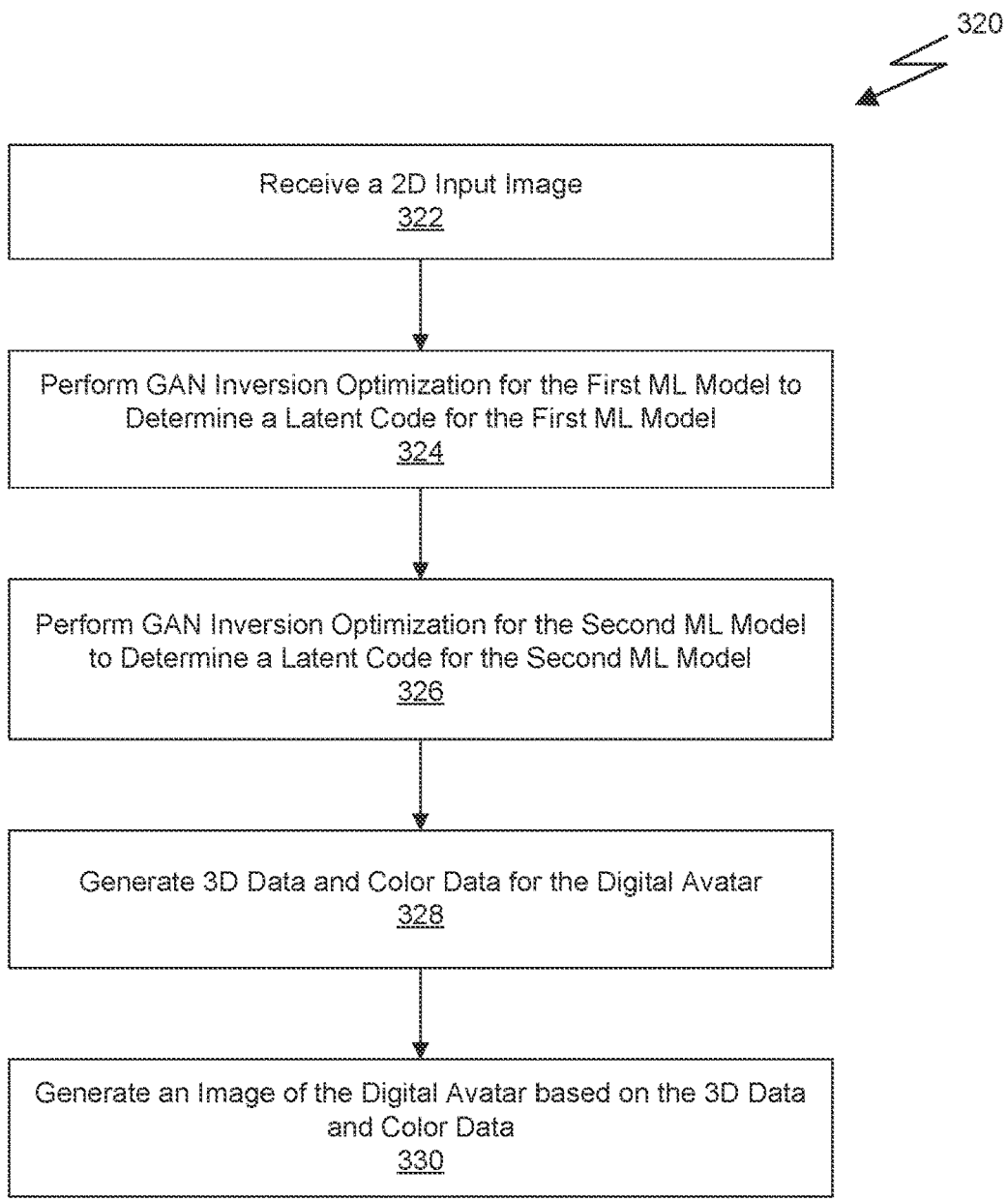
FIG. 3B is a flowchart of a method for generating a 3D digital avatar using a GAN inversion optimization algorithm, in accordance with some embodiments of the present disclosure.

FIG. 3B is a flowchart of a method 320 for generating a 3D digital avatar using a GAN inversion optimization algorithm, in accordance with some embodiments of the present disclosure. The method 320 discloses a two-step approach to implement the method 300 using GAN inversion optimization in conjunction with two, fully trained ML models (e.g., GANs). In some embodiments, the method 320 may be implemented as a set of instructions executed on at least one processor. In some cases, the at least one processor can include one or more parallel processing units.

At 322, a 2D input image is received. In some embodiments, a single input image is provided, and may be stored in a memory associated with a processor. In other embodiments, a small number of input images are provided, which may provide a number of views of an object or person from different viewpoints.

At 324, a GAN inversion optimization algorithm is performed for the first ML model in order to determine a latent code for the first ML model. The GAN inversion optimization algorithm optimizes, over a number of iterations, the latent code to cause the first ML model, when processing the optimized latent code, to generate unstructured 3D data and color data that best represents the object or person in the input image(s). The end result of the GAN inversion optimization algorithm is an optimal latent code within the latent space of the first ML model that can be used to generate a sample of the output data of the first ML model.

At 326, a GAN inversion optimization algorithm is performed for the second ML model in order to determine a latent code for the second ML model. The GAN inversion optimization algorithm optimizes, over a number of iterations, the latent code to cause the second ML model, when processing the optimized latent code, to generate 3D data and color data that best matches the 3D data and color data generated by the first ML model using the latent code determined during step 304.

At 328, the optimized latent code from step 306 is processed by the second ML model to generate 3D data and color data for the digital avatar. It will be appreciated that, in some embodiments, step 308 can be performed as part of step 306 in order to compute the loss function for the latent code during the GAN inversion optimization algorithm.

At 330, the 3D data and color data is processed by a renderer to generate an image of the digital avatar. The renderer may use any technique known in the art to produce an image of the digital avatar from the mesh and texture map(s) included in the 3D data and color data. In some embodiments, the 3D data and color data are stored in a memory or transmitted via a network to a third-party application to be rendered by the third-party application.

Figure 3C:
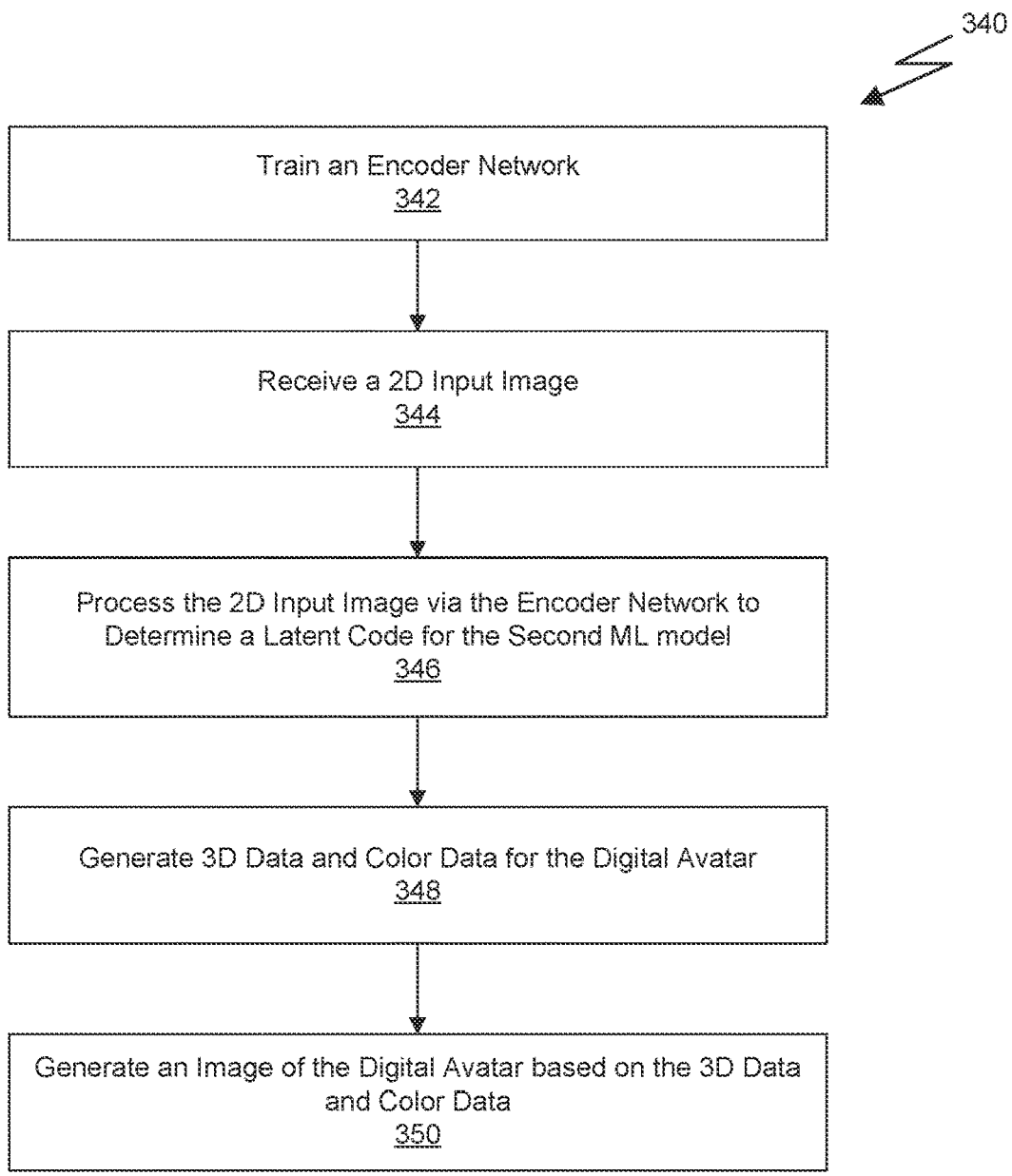
FIG. 3C is a flowchart of a method for generating a 3D digital avatar using a trained encoder network, in accordance with some embodiments of the present disclosure.

FIG. 3C is a flowchart of a method 340 for generating a 3D digital avatar using a trained encoder network, in accordance with some embodiments of the present disclosure. The method 340 represents an alternative approach to the problem of generating a 3D digital avatar once the approach disclosed by method 320 has been performed for a sufficient number of different input images to generate a training data set for an encoder network. In some embodiments, the method 340 may be implemented as a set of instructions executed on at least one processor. In some cases, the at least one processor can include one or more parallel processing units.

At 342, an encoder network is trained. In some embodiments, the encoder network is a CNN configured to process the input image and generate a corresponding latent code in the latent space of the second ML model. The training data set may consist of a number of pairs of 2D input images along with the optimized latent code for the second ML model that was produced as part of method 300. Once the two-step approach described in method 320 has been performed enough times, the resulting data set can be used to train the encoder network to learn the mapping from the input image to the latent code for the second ML model.

At 344, a 2D input image is received. Step 344 is similar to step 322, described above.

At 346, the encoder network processes the 2D input image to determine a latent code for the second ML model. Rather than performing GAN inversion optimization using the first ML model, like in step 324, the latent code for the second ML model can be generated directly by processing the input image with the trained encoder network.

At 348, the latent code from step 346 is processed by the second ML model to generate 3D data and color data for the digital avatar. Again, the second ML model only needs to be run for the single latent code to produce the optimal 3D data and color data, unlike the GAN inversion optimization algorithm described in step 306. This results in the operation for producing 3D data and color data from an input image to be performed much faster once the encoder network is available.

At 350, the 3D data and color data is processed by a renderer to generate an image of the digital avatar. Step 350 is similar to step 330, described above.

Figure 3D:
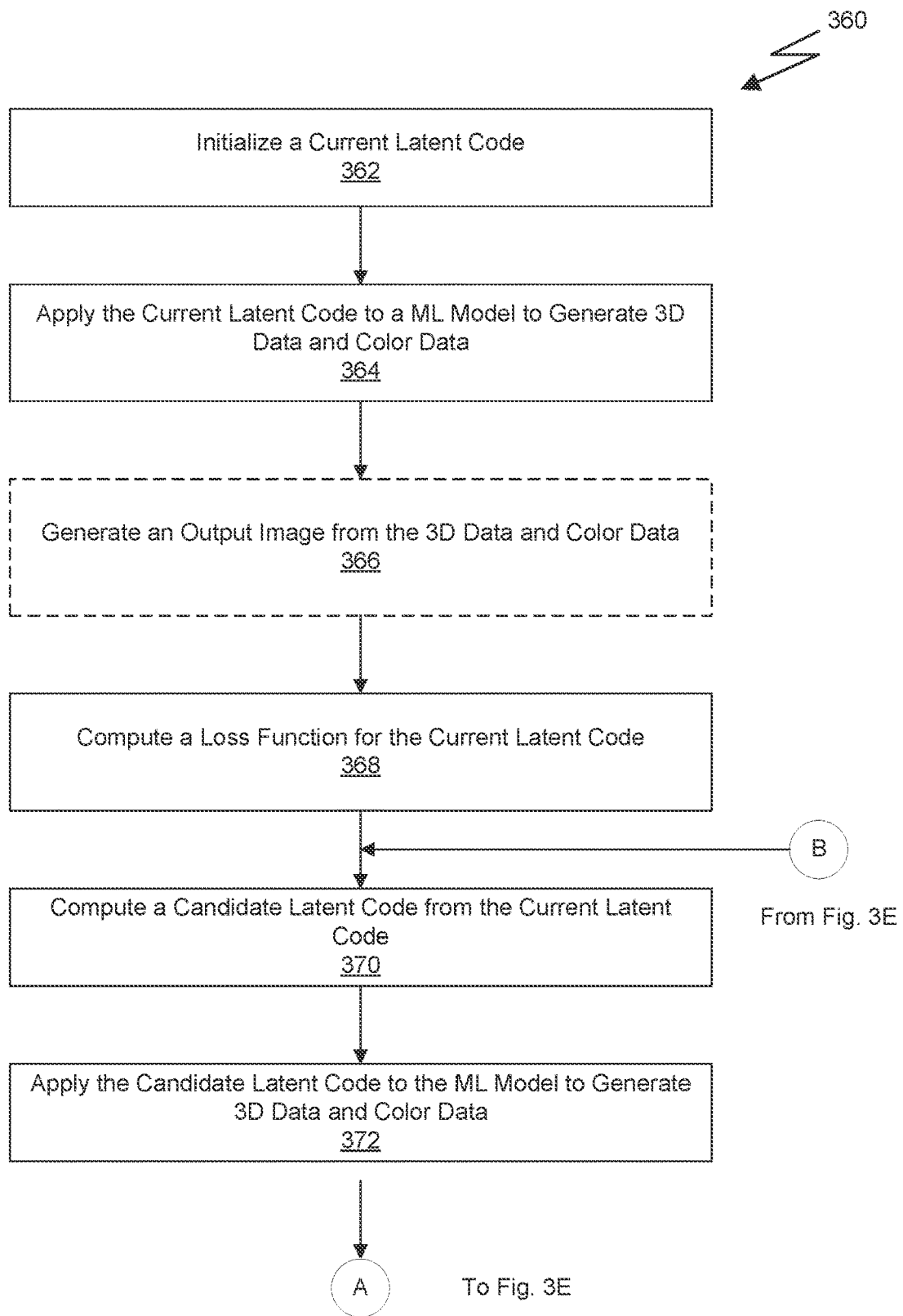
FIGS. 3D & 3E provide a flowchart of a method for a GAN inversion optimization algorithm, in accordance with some embodiments of the present disclosure.
Figure 3E:
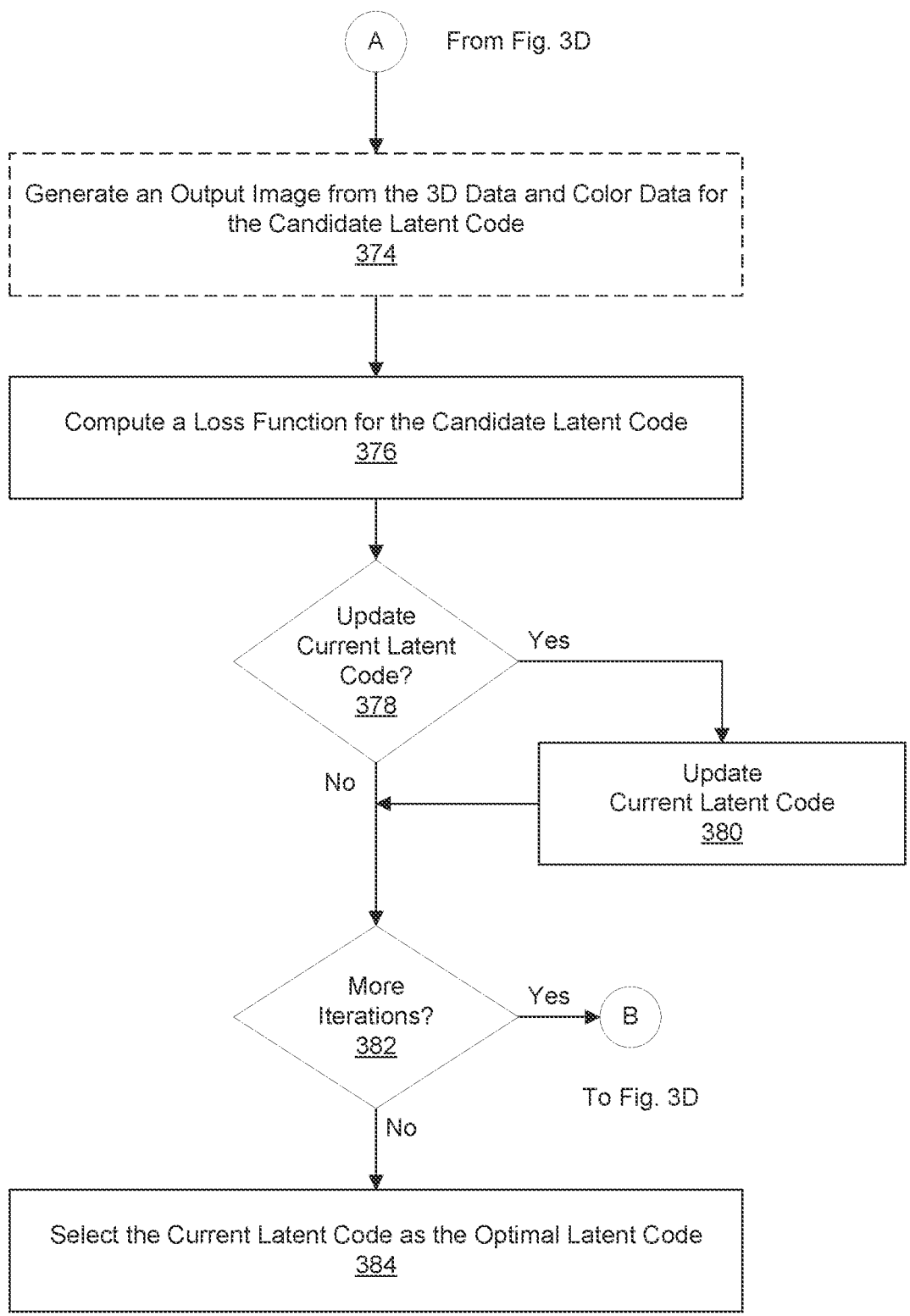

FIGS. 3D & 3E provide a flowchart of a method 360 for a GAN inversion optimization algorithm, in accordance with some embodiments of the present disclosure. In some embodiments, the method 360 may be implemented as a set of instructions executed on at least one processor. In some cases, the at least one processor can include one or more parallel processing units.

At 362, a current latent code is initialized. The current latent code may be initialized as the mean of a distribution in the latent space of the ML model. In other embodiments, the current latent code can be set to be any arbitrary valid latent code within the distribution, or may be randomly generated.

At 364, the current latent code is applied to the ML model to generate 3D data and color data.

At 366, an output image corresponding to the current latent code is generated from the 3D data and color data. A renderer can generate the output image from a particular viewpoint based on the 3D data and color data. Step 366 may be optional if the loss function can be computed directly from the 3D data and/or color data.

At 368, a loss function is computed for the current latent code. In an embodiment, the loss function can be computed by comparing a reconstructed image generated from the 3D data and color data with the 2D input image, such as by computing a LPIPS distance metric. In another embodiment, the loss function can be computed by comparing the 3D data and/or color data to a reference set of 3D data and/or color data. The reference set of 3D data and/or color data can be generated by another ML model to ensure the output of both ML models is consistent.

At 370, a candidate latent code is computed from the current latent code. In an embodiment, the candidate latent code is computed by adding noise to the current latent code. The magnitude of the noise may be tuned to keep the distance between the current latent code and the candidate latent code in the latent space of the ML model below a threshold value. In some cases, the magnitude of the noise may be decreased over a number of iterations of the GAN inversion optimization algorithm.

At 372, the candidate latent code is applied to the ML model to generate 3D data and color data.

At 374, an output image corresponding to the candidate latent code is generated from the 3D data and color data. A renderer can generate the output image from a particular viewpoint based on the 3D data and color data. Step 374 may be optional if the loss function can be computed directly from the 3D data and/or color data.

At 376, a loss function is computed for the candidate latent code. In an embodiment, the loss function can be computed by comparing a reconstructed image generated from the 3D data and color data with the 2D input image, such as by computing a LPIPS distance metric. In another embodiment, the loss function can be computed by comparing the 3D data and/or color data to a reference set of 3D data and/or color data. The reference set of 3D data and/or color data can be generated by another ML model to ensure the output of both ML models is consistent.

At 378, a determination of whether to update the current latent code is performed. The determination may include comparing the loss function for the current latent code to the loss function for the candidate latent code. If the loss function for the candidate latent code is less than the loss function for the current latent code, then, at 380, the current latent code is updated to be equal to the candidate latent code. Otherwise, the current latent code is not updated during the current iteration of the GAN inversion optimization algorithm.

At 382, a determination of whether more iterations are required is performed. The determination may include comparing a counter that indicates the number of the current iteration with a preset number of iterations to perform. In other embodiments, a determination of whether to perform more iterations can be based on a metric, such as when the loss function for the candidate latent code is below a threshold value or when the current latent code has not been updated in n number of iterations.

If more iterations are required, then the method 360 returns to 370 where a new candidate latent code is computed. Otherwise, at 384, the current latent code is selected as the optimal latent code for the ML model. The current latent code can then be applied to the ML model again to generate the optimal 3D data and color data. Alternatively, the 3D data and color data generated for the current latent code can be saved in a memory during the GAN inversion optimization method such that the current latent code does not need to be applied to the ML model again.

The methods 300, 320, 340, and 360 may be performed by any system including one or more processors, including, for example, a PPU such as the PPU 400 set forth in more detail below. However, those of skill in the art will recognize that the methods 300, 320, 340, and 360 may be performed by any system configured to implement the ML models as described above and/or any other algorithms detailed herein including the GAN inversion optimization algorithm.

Parallel Processing Architecture

Figure 4:
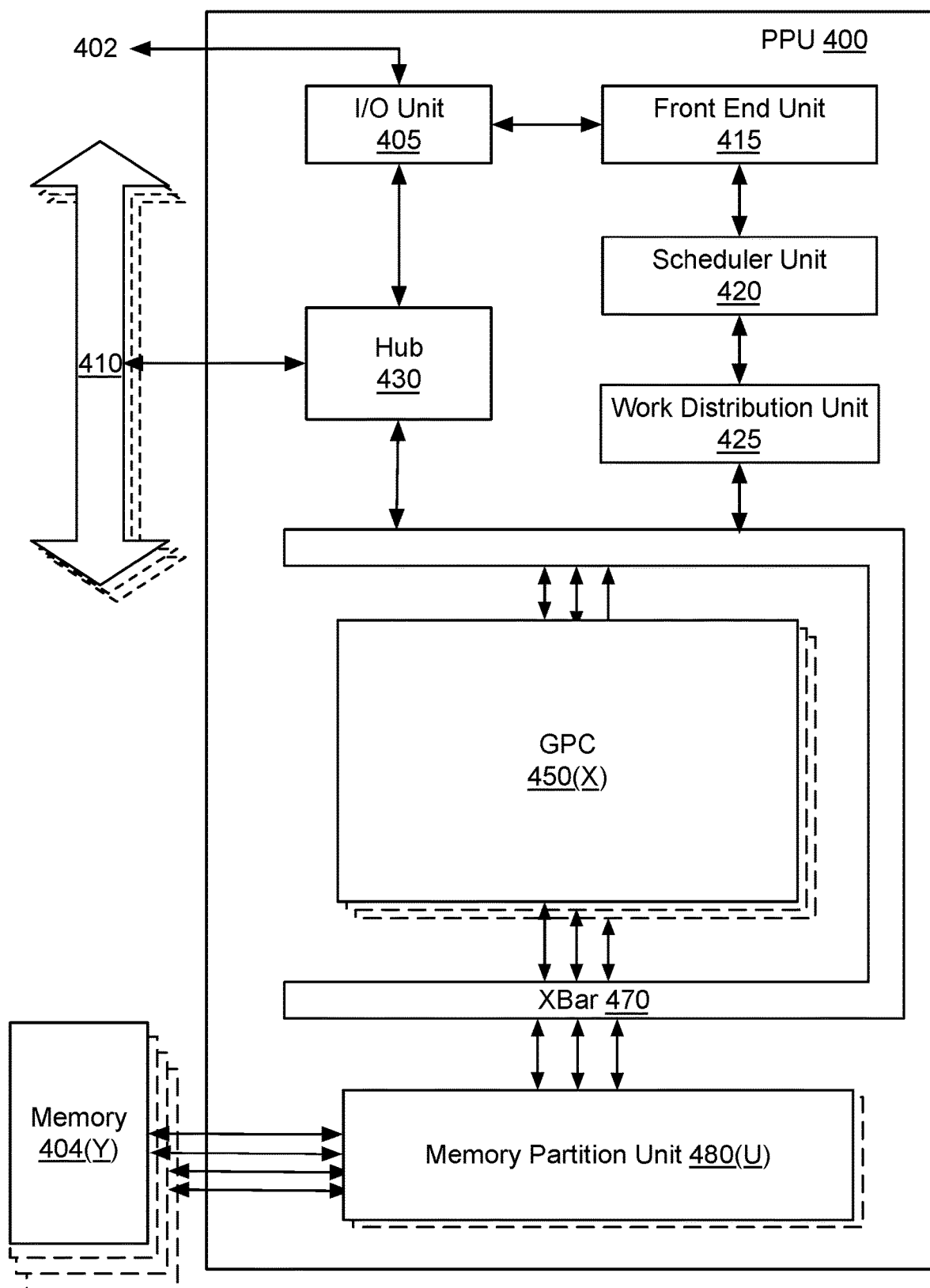
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the 3D face pipeline. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
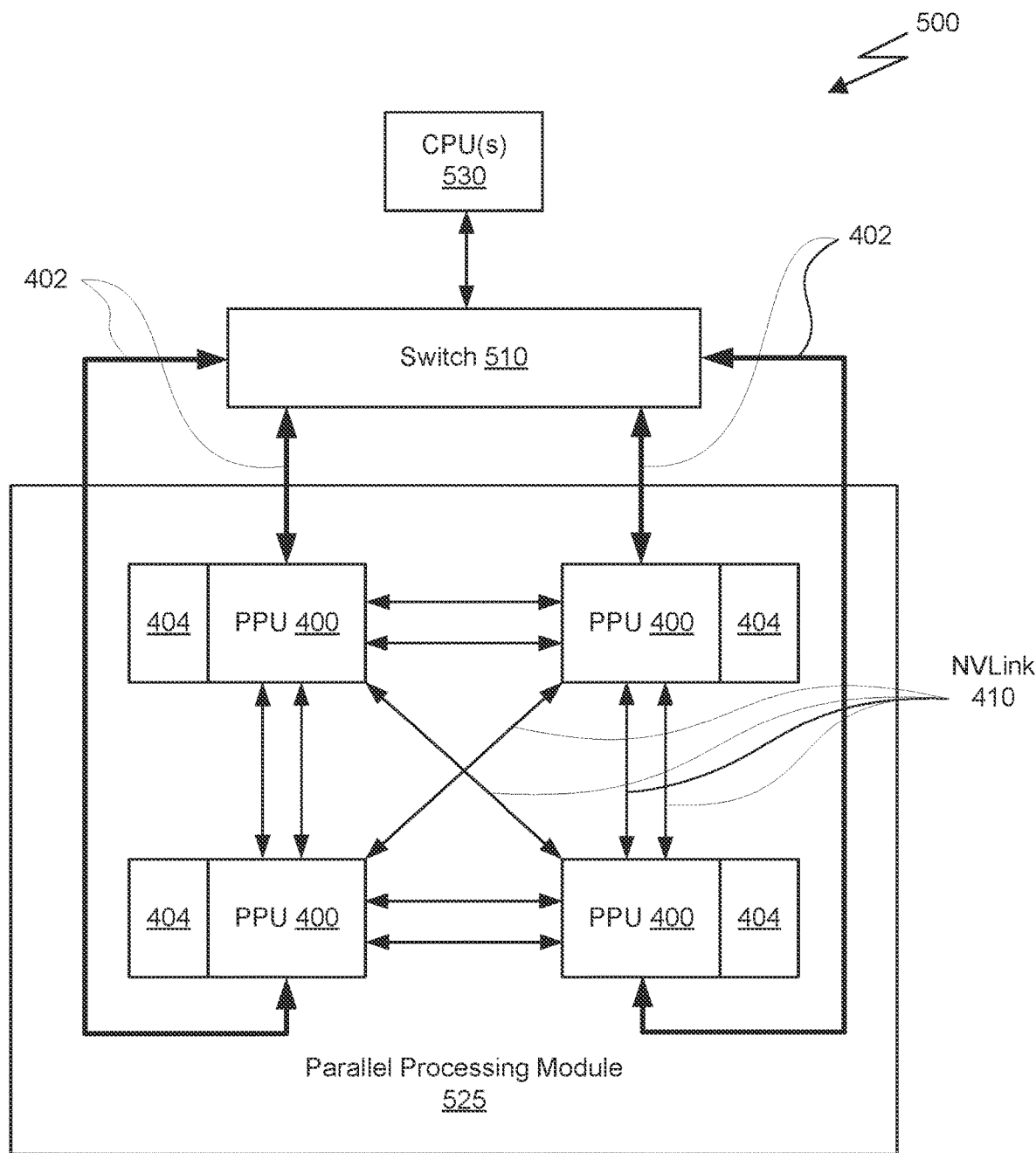
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The processing system 500 includes a CPU 530, switch 510, and multiple PPUs 400, and respective memories 404.

Figure 5B:
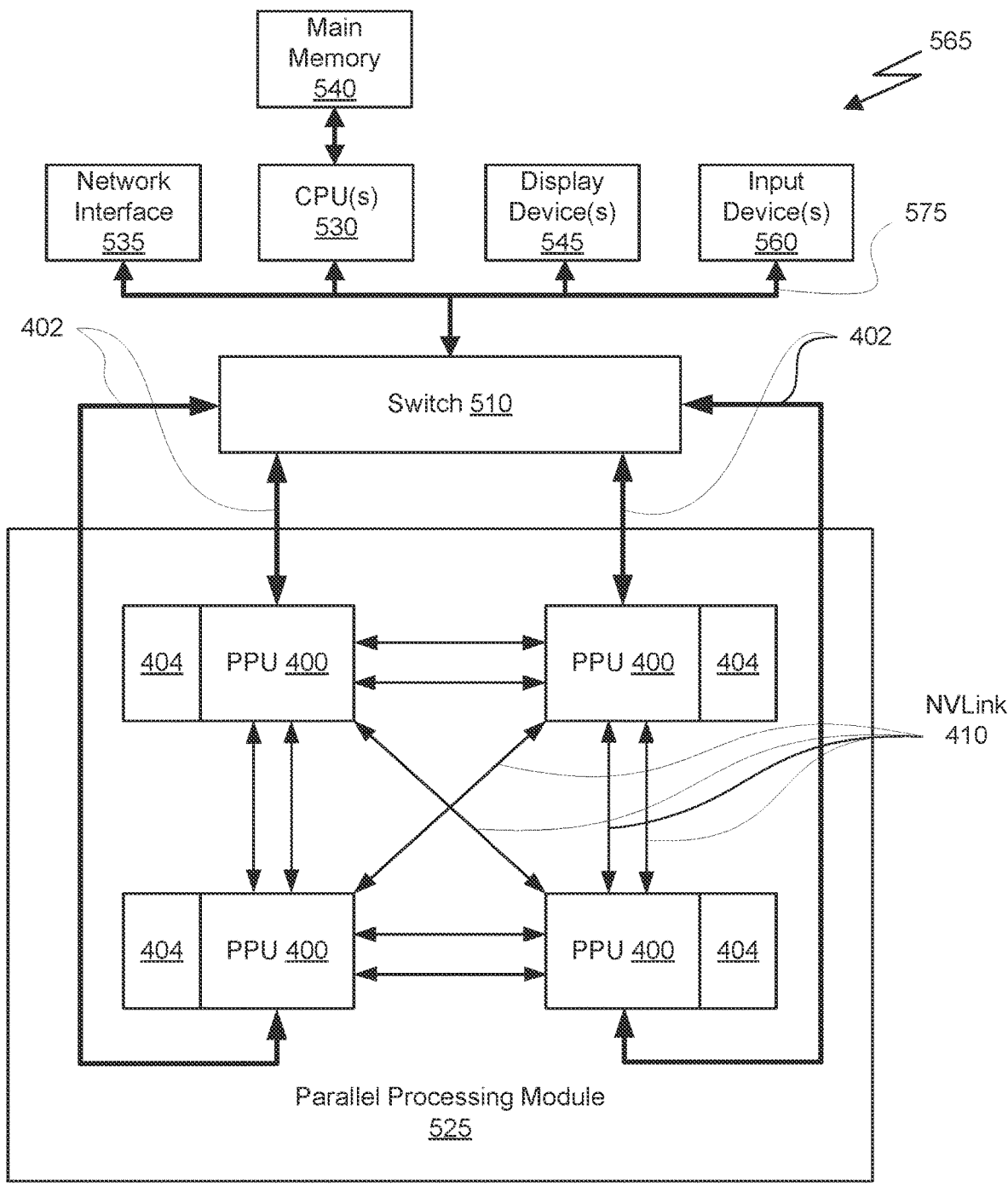
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
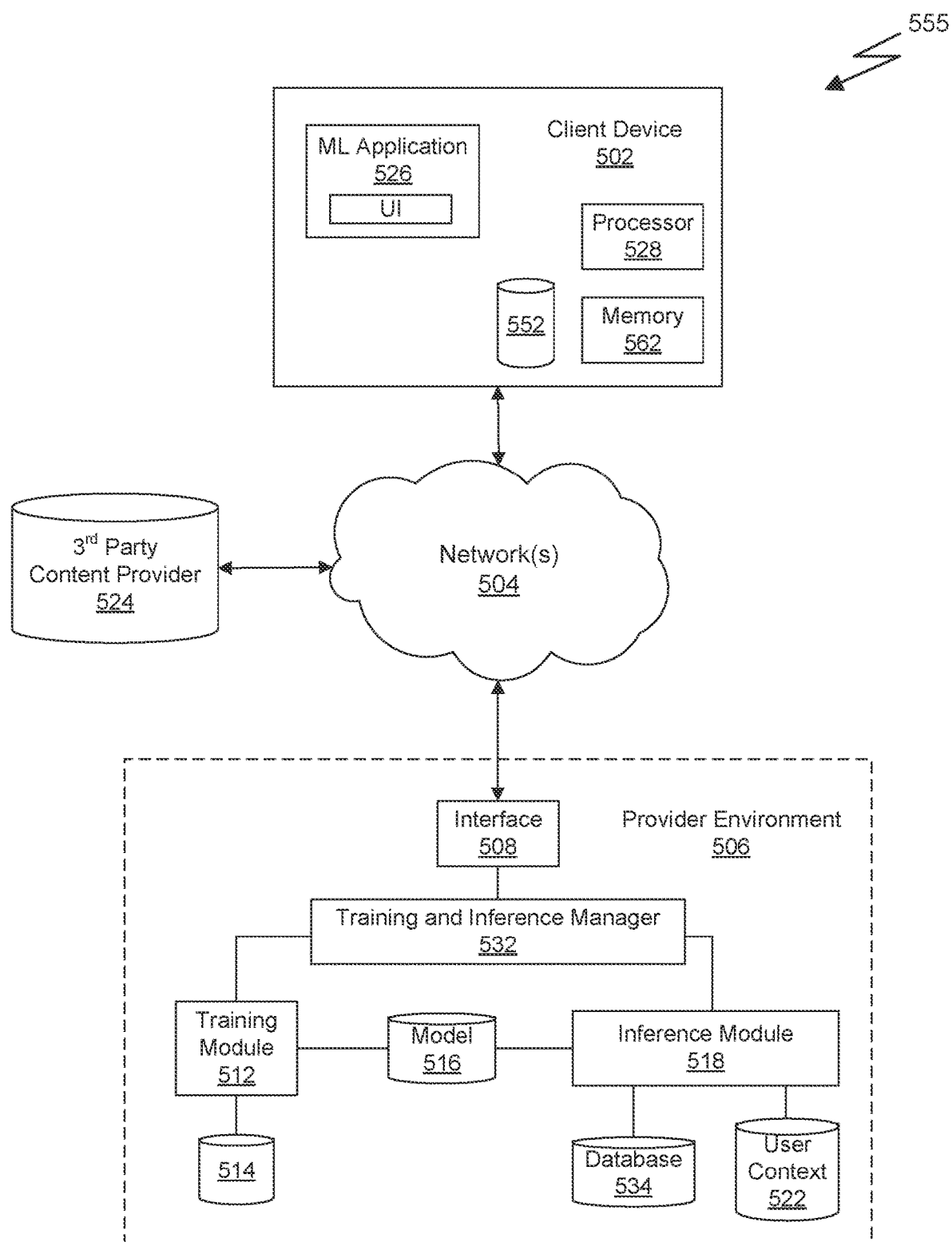
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
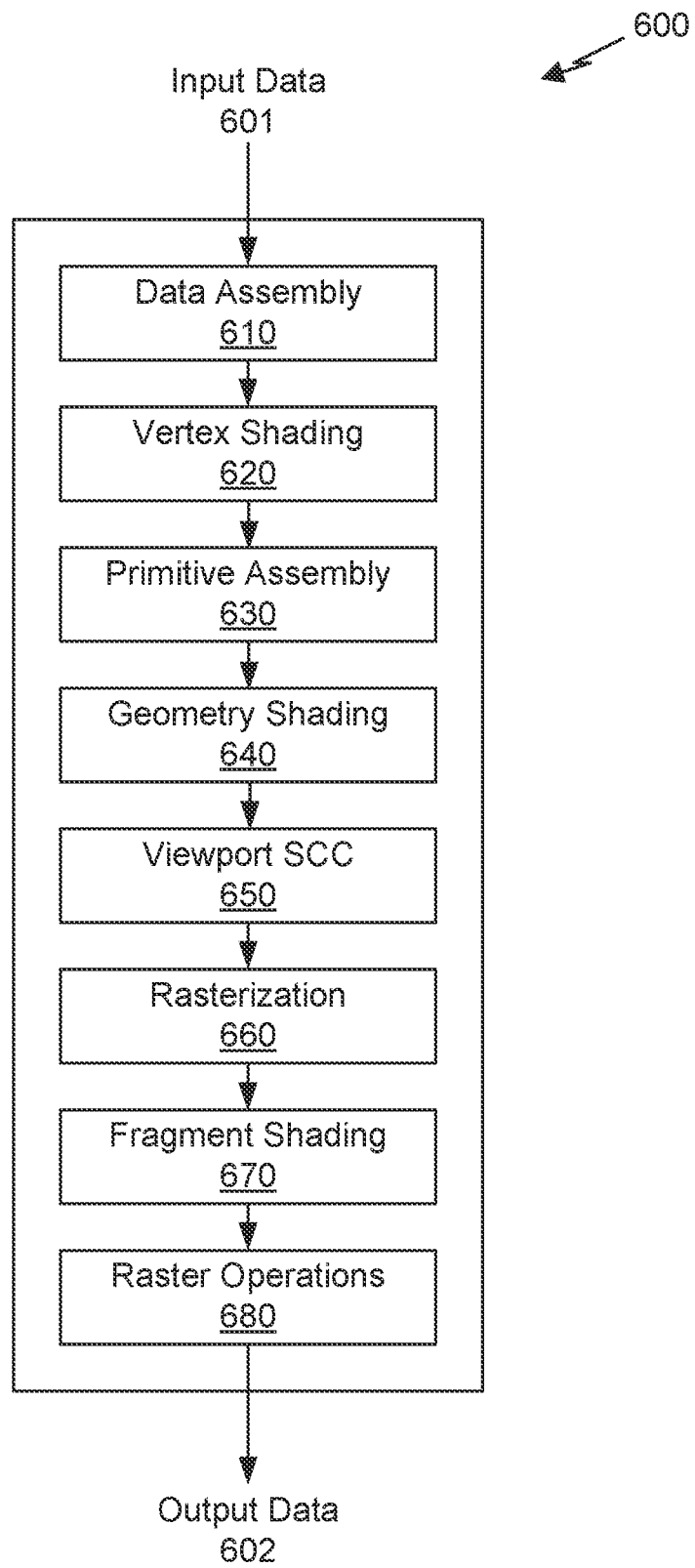
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing unit within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one processing unit (or multiple processing units). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6B:
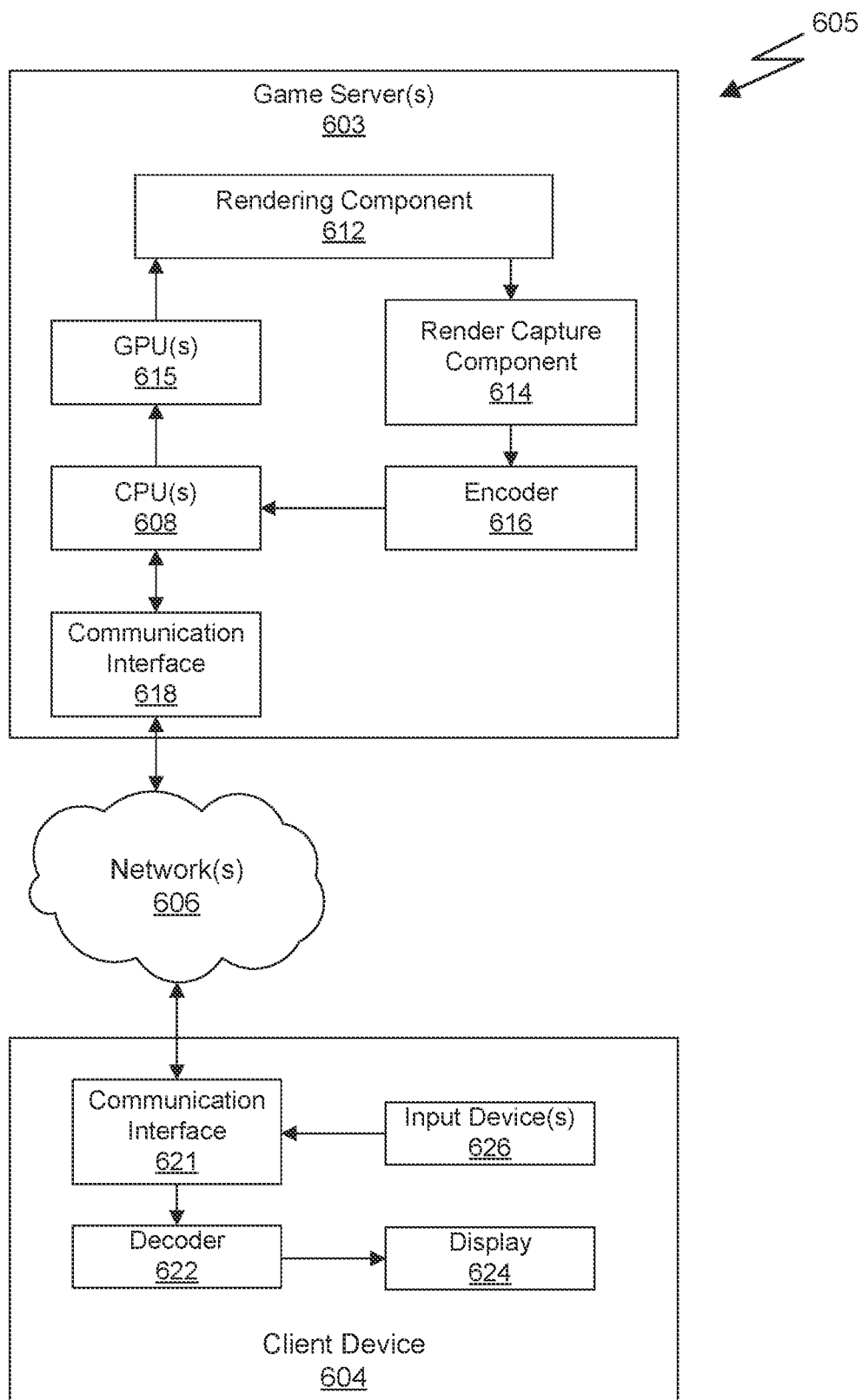
FIG. 6B illustrates an exemplary streaming system suitable for use in implementing some embodiments of the present disclosure.

FIG. 6B is an example system diagram for a streaming system 605, in accordance with some embodiments of the present disclosure. FIG. 6B includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for generating a digital avatar from a two-dimensional (2D) input image in accordance with a first machine learning (ML) model and a second machine learning (ML) model, the method comprising:
   determining a latent code for the second ML model, based at least on the 2D input image, the determining the latent code for the second ML model comprising:
      executing a GAN inversion optimization algorithm for the first ML model to determine a latent code for the first ML model; and
      executing a GAN inversion optimization algorithm for the second ML model to determine the latent code for the second ML model; and
   generating, via the second ML model, three-dimensional (3D) data and color data representing the digital avatar in accordance with the latent code for the second ML model.

2. The method of claim 1, wherein:
   executing the GAN inversion optimization algorithm for the first ML model to determine the latent code for the first ML model is based on the 2D input image; and
   executing the GAN inversion optimization algorithm for the second ML model to determine the latent code for the second ML model is based on a result of the GAN inversion optimization algorithm for the first ML model.

3. The method of claim 1, wherein executing the GAN inversion optimization algorithm for the first ML model comprises:
   initiating a current latent code for the first ML model;
   applying the current latent code to the first ML model to generate 3D data and color data corresponding to the current latent code for the first ML model;
   generating an output image from the 3D data and color data corresponding to the current latent code for the first ML model;
   computing a loss function based on a comparison of the output image with the 2D input image;
   for each iteration in a number of iterations:
      computing a candidate latent code by adding noise to the current latent code,
      applying the candidate latent code to the first ML model to generate 3D data and color data corresponding to the candidate latent code,
      generating a candidate output image from the 3D data and color data corresponding to the candidate latent code,
      computing a loss function based on a comparison of the candidate output image with the 2D input image, and
      determining whether to update the current latent code to the candidate latent code based on a comparison of the loss functions associated with the candidate latent code and the current latent code; and
   determining that the latent code for the first ML model is the current latent code at the end of the number of iterations.

4. The method of claim 3, wherein executing the GAN inversion optimization algorithm for the second ML model comprises:
   initiating a current latent code for the second ML model;
   applying the current latent code to the second ML model to generate 3D data and color data corresponding to the current latent code for the second ML model;
   computing a loss function based on a comparison of at least one of the 3D data and color data corresponding to the current latent code for the second ML model with at least one of the 3D data and color data corresponding to the latent code for the first ML model;
   for each iteration in a number of iterations:
      computing a candidate latent code by adding noise to the current latent code for the second ML model,
      applying the candidate latent code to the second ML model to generate 3D data and color data corresponding to the candidate latent code for the second ML model,
      computing a loss function based on a comparison of at least one of the 3D data and color data corresponding to the candidate latent code for the second ML model with at least one of the 3D data and color data corresponding to the latent code for the first ML model, and
      determining whether to update the current latent code for the second ML model to the candidate latent code for the second ML model based on a comparison of the loss functions associated with the candidate latent code for the second ML model and the current latent code for the second ML model; and
   determining that the latent code for the second ML model is the current latent code for the second ML model at the end of the number of iterations.

5. The method of claim 1, wherein the first ML model is a generative adversarial network (GAN) that is trained to generate unstructured 3D data and color data, and wherein the second ML model is a generative adversarial network (GAN) that is trained to generate a mesh and a texture map.

6. The method of claim 5, wherein the first ML model is an Efficient Geometry-aware 3D (EG3D) Generative Adversarial Network, and wherein the second ML model is StyleGAN2.

7. The method of claim 1, wherein the 3D data comprises at least one of a mesh or a set of polygons, and wherein the color data comprises at least one texture map associated with the 3D data.

8. The method of claim 1, further comprising rendering an image of the digital avatar based on the 3D data and the color data.

9. A method for generating a digital avatar from a two-dimensional (2D) input image in accordance with a first machine learning (ML) model and a second machine learning (ML) model, the method comprising:
   training an encoder network to infer a latent code for the second ML model based on a training data set that comprises a number of pairs of input images and corresponding ground-truth latent codes for the second ML model, wherein the training data set is generated using a GAN inversion optimization algorithm applied to the first ML model and the second ML model;
   determining a latent code for the second ML model, based at least on the 2D input image; and
   generating, via the second ML model, three-dimensional (3D) data and color data representing the digital avatar in accordance with the latent code for the second ML model.

10. The method of claim 9, wherein determining the latent code for the second ML model comprises processing the 2D input image with the encoder network to generate the latent code for the second ML model.

11. A system for generating a digital avatar in accordance with a first machine learning (ML) model and a second machine learning (ML) model, the system comprising:
   a memory storing a two-dimensional (2D) input image; and
   at least one processor to:
      determine a latent code for the second ML model, based at least on the 2D input image, the determining the latent code for the second ML model comprising:
         executing a GAN inversion optimization algorithm for the first ML model to determine a latent code for the first ML model; and
         executing a GAN inversion optimization algorithm for the second ML model to determine the latent code for the second ML model; and
      generate, via the second ML model, three-dimensional (3D) data and color data representing the digital avatar in accordance with the latent code for the second ML model.

12. The system of claim 11, wherein:
   executing the GAN inversion optimization algorithm for the first ML model to determine the latent code for the first ML model is based on the 2D input image; and
   executing the GAN inversion optimization algorithm for the second ML model to determine the latent code for the second ML model is based on a result of the GAN inversion optimization algorithm for the first ML model.

13. The system of claim 11, wherein executing the GAN inversion optimization algorithm for the first ML model comprises:
   initiating a current latent code for the first ML model;
   applying the current latent code to the first ML model to generate 3D data and color data corresponding to the current latent code for the first ML model;
   generating an output image from the 3D data and color data corresponding to the current latent code for the first ML model;
   computing a loss function based on a comparison of the output image with the 2D input image;
   for each iteration in a number of iterations:
      computing a candidate latent code by adding noise to the current latent code,
      applying the candidate latent code to the first ML model to generate 3D data and color data corresponding to the candidate latent code,
      generating a candidate output image from the 3D data and color data corresponding to the candidate latent code,
      computing a loss function based on a comparison of the candidate output image with the 2D input image, and
      determining whether to update the current latent code to the candidate latent code based on a comparison of the loss functions associated with the candidate latent code and the current latent code; and
   determining that the latent code for the first ML model is the current latent code after the number of iterations.

14. The system of claim 13, wherein executing the GAN inversion optimization algorithm for the second ML model comprises:
   initiating a current latent code for the second ML model;
   applying the current latent code to the second ML model to generate 3D data and color data corresponding to the current latent code for the second ML model;
   computing a loss function based on a comparison of at least one of the 3D data and color data corresponding to the current latent code for the second ML model with at least one of the 3D data and color data corresponding to the latent code for the first ML model;
   for each iteration in a number of iterations:
      computing a candidate latent code by adding noise to the current latent code for the second ML model,
      applying the candidate latent code to the second ML model to generate 3D data and color data corresponding to the candidate latent code for the second ML model,
      computing a loss function based on a comparison of at least one of the 3D data and color data corresponding to the candidate latent code for the second ML model with at least one of the 3D data and color data corresponding to the latent code for the first ML model, and
      determining whether to update the current latent code for the second ML model to the candidate latent code for the second ML model based on a comparison of the loss functions associated with the candidate latent code for the second ML model and the current latent code for the second ML model; and
   determining that the latent code for the second ML model is the current latent code for the second ML model after the number of iterations.

15. The system of claim 11, wherein the first ML model is a generative adversarial network (GAN) that is trained to generate unstructured 3D data and color data, and wherein the second ML model is a generative adversarial network (GAN) that is trained to generate a mesh and a texture map.

16. The system of claim 15, wherein the first ML model is an Efficient Geometry-aware 3D (EG3D) Generative Adversarial Network, and wherein the second ML model is StyleGAN2.

17. The system of claim 11, further comprising a communications interface to transmit at least one of the 3D data and color data, or an image generated based on the 3D data and color data, to a third-party application.

18. A system for generating a digital avatar in accordance with a first machine learning (ML) model and a second machine learning (ML) model, the system comprising:
   a memory storing a two-dimensional (2D) input image; and
   at least one processor to:
      train an encoder network to infer a latent code for the second ML model based on a training data set that comprises a number of pairs of input images and corresponding ground-truth latent codes for the second ML model, wherein the training data set is generated using a GAN inversion optimization algorithm applied to the first ML model and the second ML model,
      determine the latent code for the second ML model, based at least on the 2D input image, and
      generate, via the second ML model, three-dimensional (3D) data and color data representing the digital avatar in accordance with the latent code for the second ML model.

19. The system of claim 18, wherein determining the latent code for the second ML model comprises processing the 2D input image with the encoder network to generate the latent code for the second ML model.

20. A non-transitory computer-readable medium storing instructions for generating a digital avatar from a two-dimensional (2D) input image in accordance with a first machine learning (ML) model and a second machine learning (ML) model, the instructions, responsive to being executed by at least one processor, cause the processor to:
   determine a latent code for the second ML model, based at least on the 2D input image, the determining the latent code for the second ML model comprising:
      executing a GAN inversion optimization algorithm for the first ML model to determine a latent code for the first ML model, and
      executing a GAN inversion optimization algorithm for the second ML model to determine the latent code for the second ML model; and
   generate, via the second ML model, three-dimensional (3D) data and color data representing the digital avatar in accordance with the latent code for the second ML model.

* * * * *